US009098578B2

(12) United States Patent
Heim et al.

(10) Patent No.: US 9,098,578 B2
(45) Date of Patent: Aug. 4, 2015

(54) INTERACTIVE SEARCH MONITORING IN A VIRTUAL MACHINE ENVIRONMENT

(75) Inventors: Itamar Heim, Tel Aviv (IL); Vitaly Elyashev, Ramat Gan (IL); Amos Benari, Yokneam Hamoshava (IL)

(73) Assignee: Red Hat Israel, Ltd., Raanana (IL)

(*) Notice: Subject to any disclaimer, the term of this patent is extended or adjusted under 35 U.S.C. 154(b) by 322 days.

(21) Appl. No.: 13/449,188

(22) Filed: Apr. 17, 2012

(65) Prior Publication Data

US 2013/0275970 A1 Oct. 17, 2013

(51) Int. Cl.
*G06F 9/455* (2006.01)
*G06F 17/30* (2006.01)
*G06F 11/30* (2006.01)
*G06F 9/50* (2006.01)

(52) U.S. Cl.
CPC .......... *G06F 11/3079* (2013.01); *G06F 9/5066* (2013.01); *G06F 9/5077* (2013.01); *G06F 11/3072* (2013.01); *G06F 17/30477* (2013.01); *G06F 2201/815* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 7,836,070 B2 * | 11/2010 | Forstmann | 707/769 |
| 8,612,971 B1 * | 12/2013 | Fitzgerald et al. | 718/1 |
| 2004/0128670 A1 * | 7/2004 | Robinson et al. | 718/1 |
| 2008/0291899 A1 * | 11/2008 | Gromoll et al. | 370/352 |
| 2010/0332489 A1 * | 12/2010 | Benari et al. | 707/759 |
| 2011/0213765 A1 * | 9/2011 | Cui et al. | 707/711 |
| 2013/0055246 A1 * | 2/2013 | Li et al. | 718/1 |
| 2013/0055398 A1 * | 2/2013 | Li et al. | 726/25 |

* cited by examiner

*Primary Examiner* — Tammy Lee
(74) *Attorney, Agent, or Firm* — Lowenstein Sandler LLP

(57) ABSTRACT

A method and system for providing up-to-date monitoring results in a virtual machine environment are described. A host controller may receive requests to execute a plurality of searches pertaining to a plurality of objects in a virtual machine system. The host controller may execute the plurality of searches and provides the results to one or more requestors. The host controller may monitor data associated with the plurality of objects to detect a change in plurality of objects. The host controller may re-execute searches impacted by the change and may refrain from re-executing searches which are not impacted by the change.

20 Claims, 6 Drawing Sheets

INTERACTIVE SEARCH MONITORING IN A VIRTUAL MACHINE ENVIRONMENT

TECHNICAL FIELD

Embodiments of the present invention relate to management of virtual machines, and more specifically, to providing up-to-date monitoring results in a virtual machine environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

The virtualization technologies have wide applications in the computer field with the development of computer systems. For example, such virtualization technologies can be used to implement a virtual desktop application which runs within a virtual machine of a host and accessed from a client over a network.

In a large organization, thousands of virtual machines can be run on one or more hosts, making it very difficult for a system administrator to manage the virtual machines. One existing solution employs a host controller that monitors the operation of the virtual machines and allows an IT administrator to add a new virtual machine, delete an existing virtual machine, migrate a virtual machine to a different host, or perform any other action based on up-to-date information provided by the host controller. The host controller may also monitor resources, usages, hardware/software configurations, and other parameters of the virtual machines. The up-to-date information for the virtual machine system can be displayed to a user (e.g., an IT administrator) on the user's client machine via a graphical user interface (GUI). Multiple users (e.g., multiple administrators) may use multiple clients to send multiple queries for information about objects in the virtual machine system. Many of the queries sent by the users and/or clients are re-executed periodically in order to provide up to date results.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

A method and system for providing up-to-date monitoring results in a virtual machine system are described. The virtual machine system may include one or more host servers hosting virtual machines, a host controller coupled to the host servers to manage the virtual machines, and multiple clients coupled to the host servers via a network. In one embodiment, the host controller receives queries pertaining to one or more objects in the virtual machine system from a client. The objects can be, for example, host servers, virtual machines, guest operating systems, virtual desktops or other applications of the virtual machines, virtual hardware, base images of virtual machines, users, etc. Instead of periodically re-executing the queries to obtain up-to-date results, the host controller may refrain from re-executing queries until change data (indicating a change in one or more of the objects) is received from a host. The host controller may determine which queries are affected by the change data and may flag the impacted (e.g., affected) queries for re-execution at a later time, or may immediately re-execute the impacted queries.

By refraining from re-executing all queries periodically and waiting until change data is received to determine which of the queries are affected by the change data, embodiments of the present invention may reduce the amount of processing and resource usage on a host controller (e.g., reduce the number of queries which need to be re-executed), thus improving the performance of the host controller.

Figure 1:
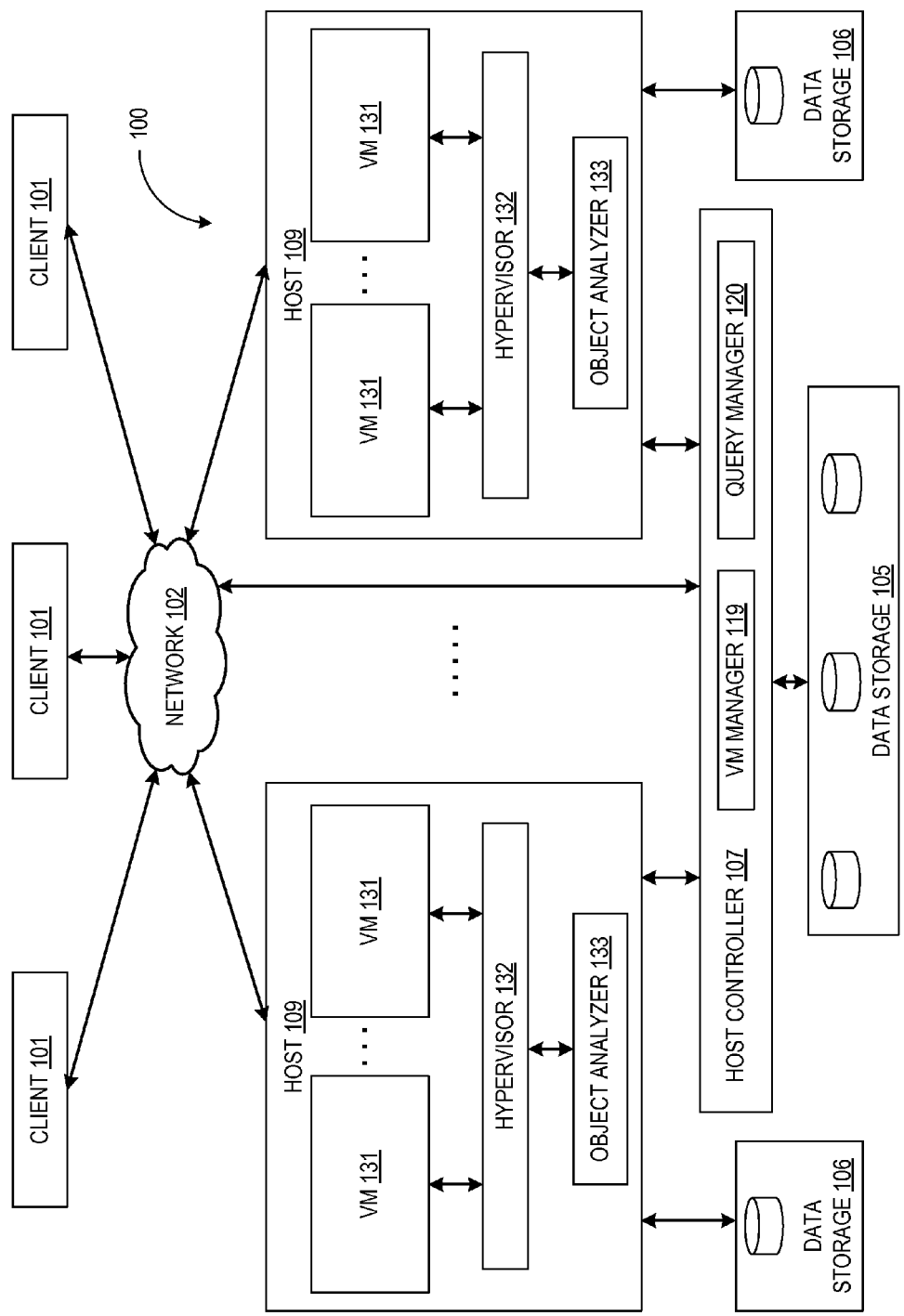
FIG. 1 is a block diagram of an exemplary network architecture in which embodiments of the invention may operate.

FIG. 1 illustrates an exemplary network architecture 100 in which embodiments of the present invention may operate. The network architecture 100 includes hosts 109 coupled to clients 101 over a network 102. The hosts 109 may be a personal computer (PC), a server computer, a personal digital assistant (PDA), a smart phone, a laptop computer, or any machine capable of executing a set of instructions (sequential or otherwise) that specify actions to be taken by that machine. The network 102 may be a private network (e.g., a local area network (LAN), a wide area network (WAN), intranet, etc.) or a public network (e.g., the Internet). The hosts 109 are also coupled to data storages 106. The data storages 106 may includes one ore more mass storage devices (e.g., disks, flash drives, etc.) to store data generated and/or used by the hosts 109.

Each host 109 may host one or more virtual machines 131. Each virtual machine 131 runs a guest operating system (OS) that may be different from one virtual machine to another. The guest OS may include Microsoft Windows®, Linux®, Solaris®, Mac® OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

The clients 101 may include computing devices that have a wide range of processing capabilities such as PCs, PDAs, smart phones, laptop computers, etc. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 may be managed by a host controller 107. The host controller 107 may be a computer coupled to the hosts 109 directly or via the network 102. The host controller 107 may also be in communication with the clients 101, via the network 102. Alternatively, the host controller 107 may be part of one of the hosts 109. In one embodiment, the host controller may include a VM manager 119. The VM manager 119 may add, remove, configure and/or modify the VMs 131 and/or the hosts 109. For example, VM manager 119 may add a new VM, remove an existing VM, change a VM (e.g., add/remove/replace virtual hardware), power on/off the hosts 109, provide directory service to the virtual machines 131, and perform other managerial functions. The host controller 107 may also have access to the data storage 105 to store and/or retrieve data. The data storage 105 may include one or more mass storage devices (e.g., disks, flash drives, etc.).

According to one embodiment, the host 109 includes an object analyzer 133. The object analyzer 133 may monitor and/or analyze the one or more of the VMs 131 executing on the host 109. The object analyzer 133 may determine whether any changes have occurred in one or more of the VMs 131 or on the host 109 (e.g., whether any changes have occurred in on or more objects). Changes in objects (e.g., the host 109 and/or the VM 131) may include, but are not limited to, the allocation of a new VM 131, the deallocation of an existing VM 131, a change in the virtual hardware on the VM 131 (e.g., more memory is added to the VM 131 or a virtual sound card is added to the VM 131), a change in the software executing on the VM 131 (e.g., the operating system on a VM 131 is changed/updated or a new application is installed on the VM 131), a change the amount or random access memory (RAM) used on a VM 131, a change in the utilization rate of a central processing unit (CPU) in the VM 131 (e.g., CPU usage), a change in the amount of virtual hard disk space used on a VM 131, a change in the name of the VM 131, etc. The object analyzer 133 may send data indicative of the changes in the objects (e.g., change data) to the host controller 107.

In one embodiment, the host controller 107 includes a query manager 120 to execute queries received from the clients 101 and to provide results of the queries to the clients 101. The clients 101 may send queries requested by users of the clients 101 or by applications executing on the clients 101. The queries may relate to various objects in the virtual machine system. The objects of the virtual machine system may include, for example, host servers, virtual machines, guest operating systems, virtual desktops or other applications of the virtual machines, base images of virtual machines, users, etc. For example, a query may inquire about resource usage (e.g., CPU usage, memory usage, storage usage, etc.), or availability of the VMs 131. In another example, a query may require to show all VMs that are running on a host that has a CPU usage greater than 90 percent. Other examples of queries may include, but are not limited to, queries regarding object identifiers (e.g., host or virtual machine names), whether certain hardware and/or software is present in a virtual machine 131, the type of guest operating system or environment running on a virtual machine 131, and capabilities of a virtual machine 131.

The query manager 120 may re-execute the queries of various clients 101 to obtain up-to-date information for the relevant object(s) in the virtual machine system 120. In one embodiment, the query manager 120 may associate a query with the client 101 which sent the query. The query manager 120 may send updated search results to the client which is associated with the query, when the query is re-executed. In another embodiment, multiple clients may be associated with a query and the updated search results may be sent to the multiple clients when the query is re-executed. For example, three different clients may send the same query to the query manager 120. The query manager may associated all three clients with the query and send the three clients updated results when the query is re-executed.

In one embodiment, the query manager 120 may refrain from re-executing queries until change data is received from one or more hosts 109 (e.g., until change data is received from one or more object analyzers 133). The query manager 120 may analyze the change data (e.g., an addition of a VM or a change in the memory usage of a VM) to determine which objects have changed (e.g., which VM) and how the objects have changed (e.g., how much the CPU usage has changed). If the change data affects one or more queries (e.g., if a change is associated with a result of a query or is associated with a criterion of a query), the one or more queries may be flagged for re-execution and/or may be immediately re-executed. In one embodiment, if the change data is associated with a search criterion of a previously executed query, the query manager 120 may flag the previously executed query to indicate that the previously executed query should be re-executed, or the query manager 120 may immediately execute the previously executed query. In another embodiment, if the change is associated with a result of a previously executed query (e.g., if there is a change in the attributes of a VM 131 which was included in a previous search result), the query manager 120 may also flag the previously executed query to indicate that the previously executed query should be re-executed, or the query manager 120 may also immediately execute the previously executed query. In one embodiment, multiple change data may be received from multiple object analyzers 133.

As discussed above, the query manager 120 may flag queries for re-execution (e.g., may flag a query to be re-executed at a later time) and/or may immediately re-execute queries. The query manager 120 may analyze the change data in order to determine whether to immediately execute the queries which are affected by the change data and/or to determine a schedule time to re-execute the queries. For example, the query manager 120 may re-execute searches once every 5 minutes, in order to reduce the load on the host controller 107. The query manager 120 may analyze change data and may flag a query to be re-executed at the next 5 minute interval (e.g., at the next polling interval). In another example, the query manager 120 may specific a specific time at which a query should be re-executed (e.g., re-execute the query in 30 seconds, or re-execute the query at 1:15 PM). In one embodiment, the query manager 120 may also use one or more re-execution criteria when determining whether to immediately execute the queries which are affected by the change data and/or to determine a schedule time to re-execute the queries.

In one embodiment, the query manager 120 may generate events when change data (e.g., changes in one or more objects) is received from one or more object analyzers 133. For example, when the memory usage of a VM 131 changes, the object analyzer 133 may send change data to the query manager 120 to indicate a change in the memory usage of the VM 131 and the query manager 120 may generate an event based on the change data (e.g., an event for a change in memory usage). The events generated by the query manager 120 may be related to particular objects in the virtual machine system (e.g., related to a particular VM 131 or a particular host 109), related to a particular change in the objects in the virtual machine system (e.g., related to memory usage, CPU usage, operating system type, etc.), and/or related to thresholds for the changes in the objects (e.g., related changes in memory usage which result in a memory usage greater than 90%). The queries may subscribe to (e.g., register for) the events generated by the query manager 120.

In one embodiment, a query may subscribe to one or more events before the query is executed, or at the time the query is executed. For example, after a user or administrator submits a query, the query manager 120 may automatically subscribe the query to one or more events prior to executing the query or at the same time the query is executed. In another embodiment, the query manager 120 may automatically subscribe a query to one or more events based on the results of the executed query. For example, if the results of a query include a particular entity (e.g., a particular VM), the query may subscribe to events which are associated with that VM. In a further embodiment, a user or administrator may indicate that a query should subscribe to one or more events and/or may indicate which events a query should subscribe to, when the user or administrator submits the query to the query manager 120. For example, an administrator may use a user interface (e.g., a GUI) submit a query to find all VMs in a virtual machine system, which have a CPU usage lower than 50%. The administrator may use the user interface (e.g., a GUI) to indicate that the query should be subscribed to events associated with CPU usage.

In one embodiment, when an event is generated by the query manager 120, the query manager may determine which queries are subscribed to (e.g., registered to) the event and may flag the one or more of the subscribed queries for re-execution at a later time and/or may immediately re-execute one or more of the subscribed queries. For example, one or more queries may be subscribed to events related to a particular VM 131. When an event is generated for the particular VM 131 (e.g., an event is generated for a change in memory usage, change in CPU usage, etc.), the one or more queries which are subscribed to the event may be flagged for re-execution and/or immediately re-executed. In another example, one or more queries may be subscribed to events related a particular type of change in an object (e.g., changes in CPU usage or changes in memory usage). In one embodiment, when the query manager 120 receives change data indicating a particular type of change (e.g., a change in CPU usage on a VM 131) the query manager 120 may analyze the change data to determine whether the change in the object meets a threshold (e.g., whether the change in CPU usage results in a CPU usage greater than 75%) and may generate an event if the change in the attribute meets the threshold. One or more queries which are subscribed to the event may be flagged for re-execution at a later time and/or immediately re-executed. This may allow the query manager 120 to quickly determine which queries are affected by a change in an attribute because the queries which should be re-executed (e.g., which are affected by the change in the object) are subscribed to the event. For example, the query manager 120 may not need to analyze all previously executed queries to determine which queries should be re-executed, but instead, may simply re-execute queries which are subscribed to an event.

Figure 2:
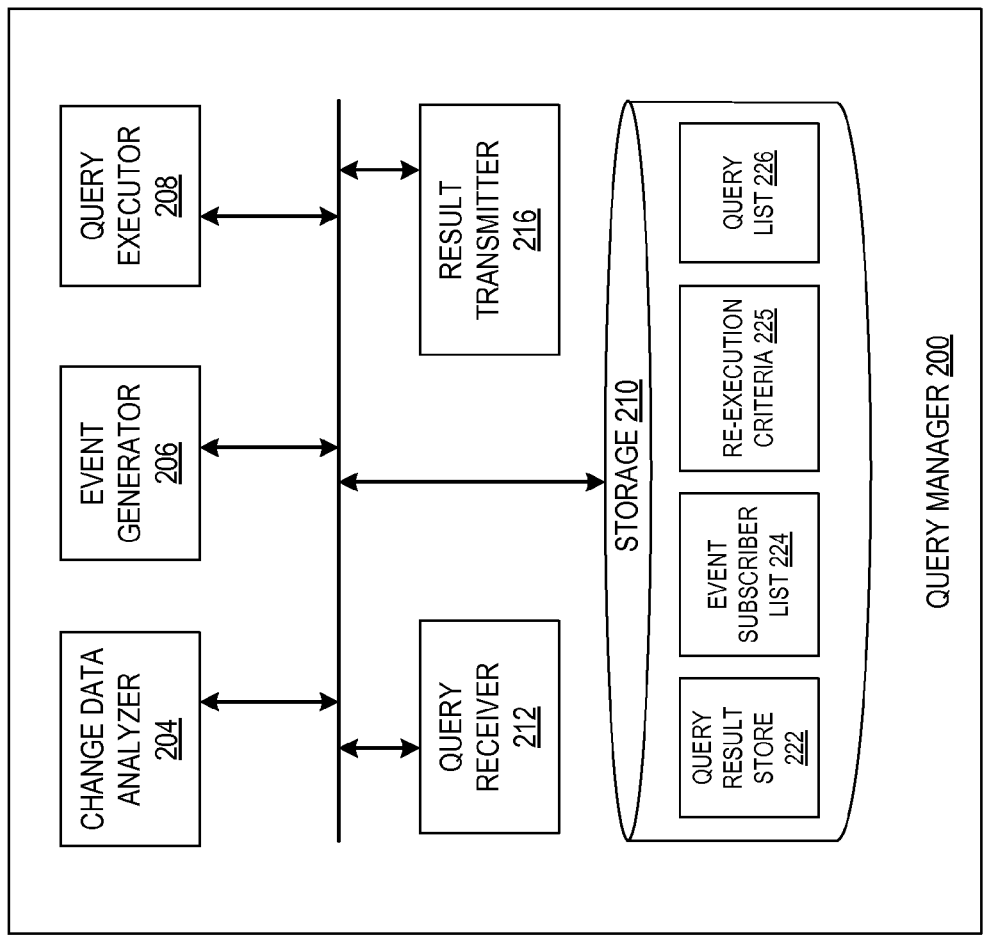
FIG. 2 is a block diagram illustrating one embodiment of a query manager.

FIG. 2 is a block diagram illustrating one embodiment of a query manager 200. The query manager 200 may include a change data analyzer, an event manager 206, a query executor 208, a query receiver 212, a storage 210, and a result transmitter 216. More or less components may be included in the query manager 200 without loss of generality.

In one embodiment, the query manager 200 may execute and/or re-execute one or more queries received from one or more clients. The queries may pertain to objects and/or changes in objects of the virtual machine system. The objects of the virtual machine system may include, for example, host servers, virtual machines, guest operating systems, virtual desktops or other applications of the virtual machines, virtual hardware, base images of virtual machines, users, etc.

The storage 210 may include search results 222, event subscriber list 224, re-execution criteria 225, and a query list 226. The query list 226 may include queries previously submitted by clients, with each query being associated with one or more clients that submitted the query and are registered to receive the query results. For example, a client "A" may submit a query "X" and a client "B" may submit query "X" and query "Y." The query list 226 may store query "X" in association with clients "A" and "B" that are registered to receive the results of query "X" and may store query "Y" in association with client "B" that is registered to receive the results of query "Y." The query result store 222 may store results of previous queries. For example, the results of queries "X" and "Y" may be stored in query result store 222. The event subscriber list 224 may include a list of events and the queries which are subscribed (e.g., registered for) the events. The re-execution criteria 225 may include one or more rules and/or criteria for determining when a query should be re-executed (e.g., re-executed immediately or re-executed at a scheduled time). For example, the re-execution criteria 225 may include a rule indicating that queries which are impacted by a change which is related to adding or removing a VM, should be re-executed immediately. In another example, the re-execution criteria 225 may include a rule indicating that when a change in an object of the virtual machine system exceeds a certain threshold (e.g., CPU usage increases past 75%), then a query impacted by the change should be executed immediately. In a further example, the re-execution criteria may include a rule indicating that for certain types of changes (e.g., a change in virtual hard drive space on a VM), queries which are impacted by these changes should be re-executed at a scheduled time.

In one embodiment, the query receiver 212 receives queries from different clients and compares each query with previous queries stored in the query list 226. If the query list 226 includes a similar query, the query receiver 212 associates the similar query with the client that requested the query, and may invoke the result transmitter 216 to provide a result of a last execution of the similar query (which may be stored in query result store 222) to the requesting client. If the query list 226 does not include a similar query, the query receiver 212 adds the new query to the query list 226, and associates the new query with the client that requested the new query, invokes the query executor 208 to execute the new query, and stores the result in the query result store 222. The result transmitter 216 then provides this result to the requesting client.

In one embodiment, the change data analyzer 204 may receive change data from an object analyzer executing on a host. The change data may indicate a one or more changes in one or more objects in the virtual machine system. The change data analyzer 204 may analyze the change data to determine which objects have changed and how the objects have changed.

In one embodiment, the change data analyzer 204 may analyze the object (e.g., the VM) associated with the change data and may analyze the query result store 222 to determine whether the object associated with the change data is within the results of previous queries (which are stored in the query list 226). For example, if the change data is associated with a particular VM, the change data analyzer 204 may analyze the query result store 222 to determine if the particular VM was a result in previous queries. If the object is within the results of one or more previous queries, the change data analyzer 204 may flag the one or more previous queries for re-execution and/or may invoke the query executor 208 to immediately re-execute the one or more previous queries. In another embodiment, the change data analyzer 204 may analyze the change data to determine if the change data is associated with one or more criteria of previous searches. If the change data is associated with a criteria of one or more previous searches, the change data analyzer 204 may flag the one or more previous queries for re-execution and/or may invoke the query executor 208 to immediately re-execute the one or more previous queries.

As discussed above, the change data analyzer 204 may flag a query for re-execution and/or may immediately re-execute a query. In one embodiment, the change data analyzer 204 may analyze the change data to determine whether a query should be immediately re-executed or should be flagged for re-execution. For example, if the change data indicates that a VM has been added or deleted, the changed data analyzer 204 may immediately re-execute the search. In another embodiment, if the change data analyzer 204 determines that the query should be flagged for re-execution, the change data analyzer 204 may additionally determine a scheduled time for the query executor 208 to re-execute the query. For example, if the hard disk space of a particular VM has changed, previous queries which had query results that included the particular VM may be flagged for re-execution at a scheduled time. In another embodiment, the change data analyzer 204 may use the re-execution criteria 225 (e.g., a rule) to determine whether a query should be re-executed immediately, or should be re-executed at a specified time (e.g., at the next polling interval, after a certain period of time such as 30 seconds, or at a specific time such as 2:35 AM).

As discussed above, a query may be subscribed to events. In one embodiment, the change data analyzer 204 may use the event manager 206 to generate one or more events, based on the change data received from an object analyzer. For example, the change data analyzer 204 may provide the change data to the event generator 206 and the event generator 206 may generate one or more events based on the change data and/or the object associated. The change data analyzer 204 may use the events generated by the event generator 206 and the event subscriber list 224 to determine which queries are subscribed to the generated events. The change data analyzer may flag the subscribed queries for re-execution and/or may invoke the query executor 208 to immediately re-execute the subscribed queries.

In one embodiment, the query executor 208 may re-execute queries to refresh the results of the queries and/or to keep the results of the queries up to date. In one embodiment, the query executor 208 may refrain from re-executing a query unless the query is flagged for re-execution (e.g., flagged for re-execution based on change data received from an object analyzer). In one embodiment, a query which is flagged for re-execution may be flagged for re-execution at a schedule time (e.g., flagged for re-execution at the next polling interval, flagged for re-execution in 30 seconds, or flagged for re-execution at 12:00 AM). The query executor 208 may wait until the scheduled time, before re-executing the flagged query. In a further embodiment, the query executor 208 may re-execute a query when it is invoked by the change data analyzer 204. When the query executor 208 re-executes the queries, the updated (e.g., refreshed) results may be sent to the clients associated with the query using the result transmitter 216.

Figure 3:
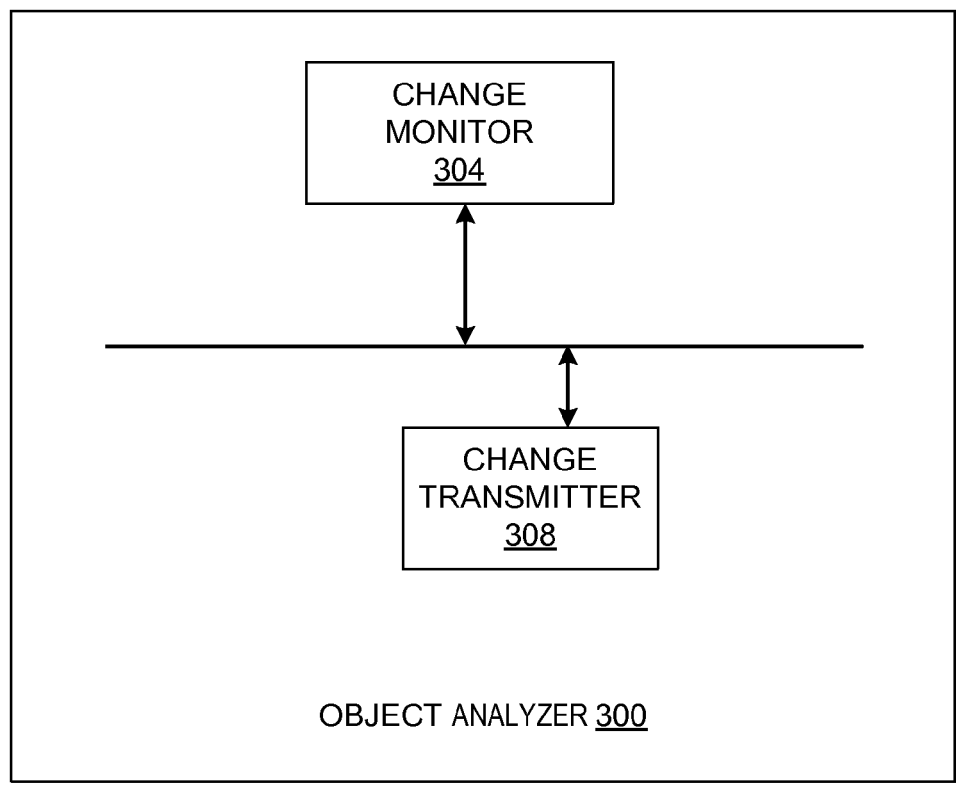
FIG. 3 is a block diagram illustrating one embodiment of an object analyzer.

FIG. 3 is a block diagram illustrating one embodiment of an object analyzer 300. The object analyzer 300 may include a change monitor 304 and a change transmitter 308. More or less components may be included in the object analyzer 300 without loss of generality.

In one embodiment, the change monitor 304 may analyze and/or monitor one or more objects the virtual machine system to determine if a change has occurred in the one or more objects. For example, the change monitor 304 may monitor the CPU usage or memory usage of a VM (e.g., may monitor one or more attributes). In another example, the change monitor 304 may monitor the host to determine whether a VM was added or removed from the host. When the change monitor 304 detects a change in an object (e.g., a VM is added or memory usage of a VM has changed) the change monitor 304 may generate change data (e.g., data indicative of one or more objects and indicative of the changes in the one or more objects) and may provide the change data to the change transmitter 308. The change transmitter 308 may transmit the change data to the host controller.

Figure 4:
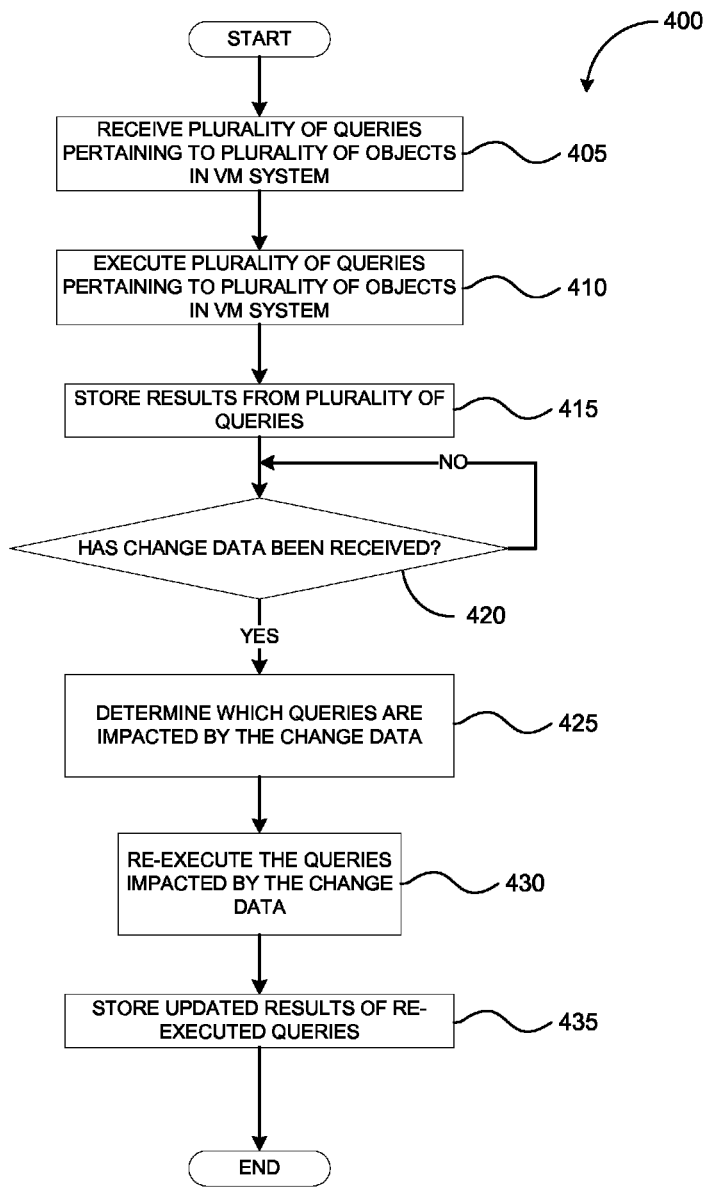
FIG. 4 is a flow diagram illustrating an embodiment for a method of updating query results.

FIG. 4 is a flow diagram illustrating an embodiment for a method 400 of updating query results. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a host controller (e.g., the host controller 107 of FIG. 1).

Referring to FIG. 4, the method 400 starts at block 405 with the host controller receiving various queries pertaining to different objects in a virtual machine system (e.g., receiving queries regarding names, resource usage, operating system types, etc., of VMs in the virtual machine system). At block 410, the virtual machine system executes the queries pertaining to the different objects in the virtual machine system. The results of the plurality of queries are stored in a data store at block 415. At block 420, the host controller determines whether change data has been received from one or more hosts. If no change data has been received, the host controller refrains from re-executing any queries and the method 400 proceeds back to block 420.

If change data has been received from one or more hosts, the host controller determines which queries are impacted (e.g., affected) by the change data (block 425). For example, the host controller may determine whether the change data is associated with an object which is included in the results of previous queries. In another example, the host controller may determine whether the change data is associated with criteria of previous queries. In one embodiment, the host controller may generate an event based on the change data and may determine which queries are subscribed to the generated event. The queries which are subscribed to the generated event may be considered queries which are impacted by the change data. In another embodiment, the host controller may refrain from re-executing queries which are not impacted or affected by the change data. After determine which queries are impacted by the change data, the host controller re-executes the queries which are impacted by the change data at block 430. At block 435, the host controller stores the updated results of the re-executed queries and/or provides the update results to clients which are associated with the re-executed queries.

Figure 5:
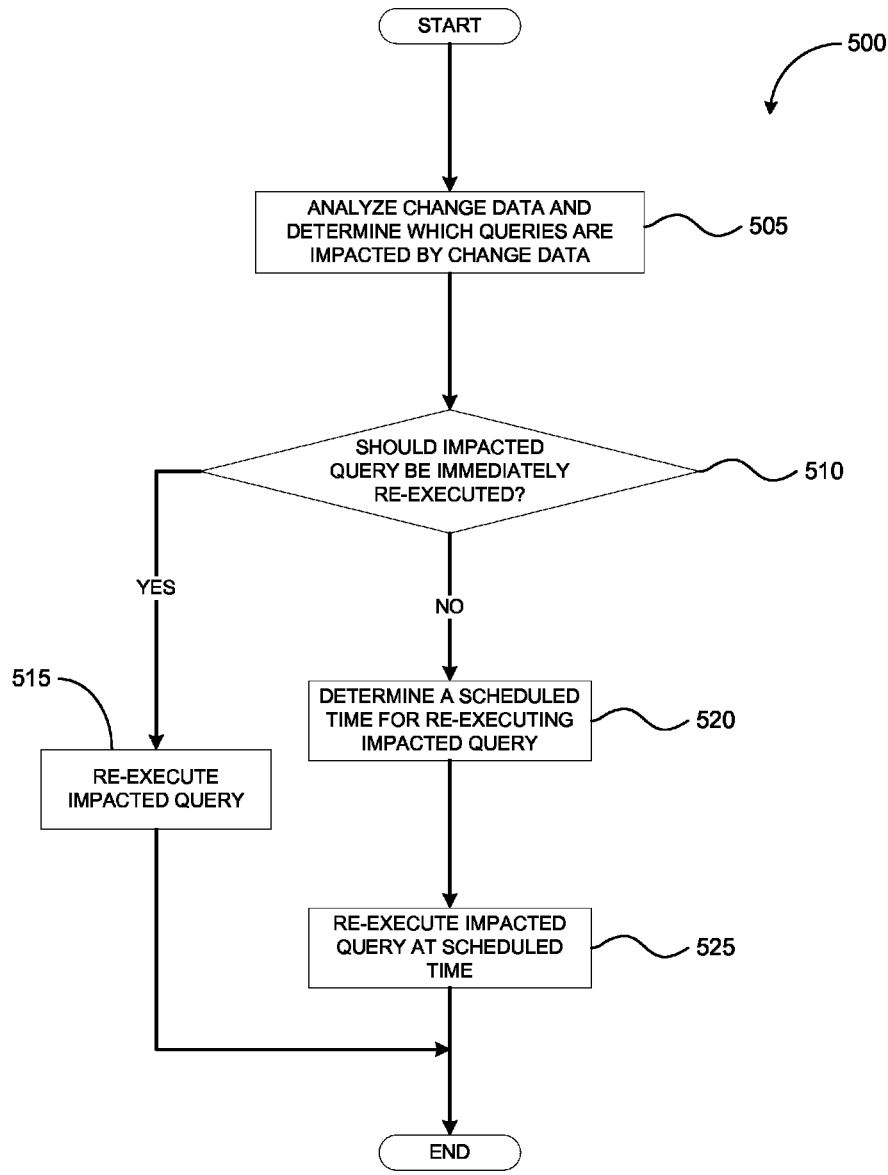
FIG. 5 is a flow diagram illustrating another embodiment for a method of updating query results.

FIG. 5 is a flow diagram illustrating another embodiment for a method 500 of updating query results. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a host controller (e.g., the host controller 107 of FIG. 1).

Referring back to FIG. 5, the method 500 starts at block 505 where the host controller analyzes change data received from one or more hosts and determines which queries are impacted by the change data. As discussed above, the host controller may generate an event and may obtain subscribers for the generated event to determine which queries are impacted by the change data.

At block 510, the host controller determines whether a query impacted by the change data should be immediately re-executed. As discussed above the host controller may analyze the change data to determine whether the impacted queries should immediately be re-executed. For example, if the change data is associated with one or more criteria of a previous query, the previous query may be immediately re-executed. In another embodiment, host controller may analyze the type of the change data in order to determine whether a query should be immediately re-executed. For example, if the change data indicates a utilization change in an object (e.g., a CPU usage change in a VM), then an impacted query may not be immediately re-executed because the utilization change may be a low priority change. In another example, if the change data indicates that a VM has been added or removed from the virtual machine system, then an impacted query may be immediately re-executed because the addition or removal of a VM from the virtual machine system may be a higher priority change. In one embodiment, the host controller may use one or more re-execution criteria to determine whether an impacted query should be re-executed immediately, as discussed above. If the host controller determines that the impacted query should be immediately re-executed, the host controller will re-execute the impacted query and may update the search results for the impacted query at block 515.

If the host controller determines that the impacted change should not be re-executed immediately, the host controller may determine a schedule time for re-executing the impacted query (block 520). In one embodiment, the host controller may determine the schedule time based on the type of the change data. For example, for higher priority changes, the host controller may determine that the impacted query should be re-executed after a short amount of time (e.g., in 5 seconds or at a particular time). In another example, for lower priority changes, the host controller may determine that the impacted query should be re-executed after a longer period of time (e.g., in 120 seconds, or at a particular time). In one embodiment, the host controller may use one or more re-execution criteria to determine a scheduled time to re-execute a query impacted by the change data. At block 525, the impacted query is re-executed at the scheduled and the search results for the impacted query are updated.

Figure 6:
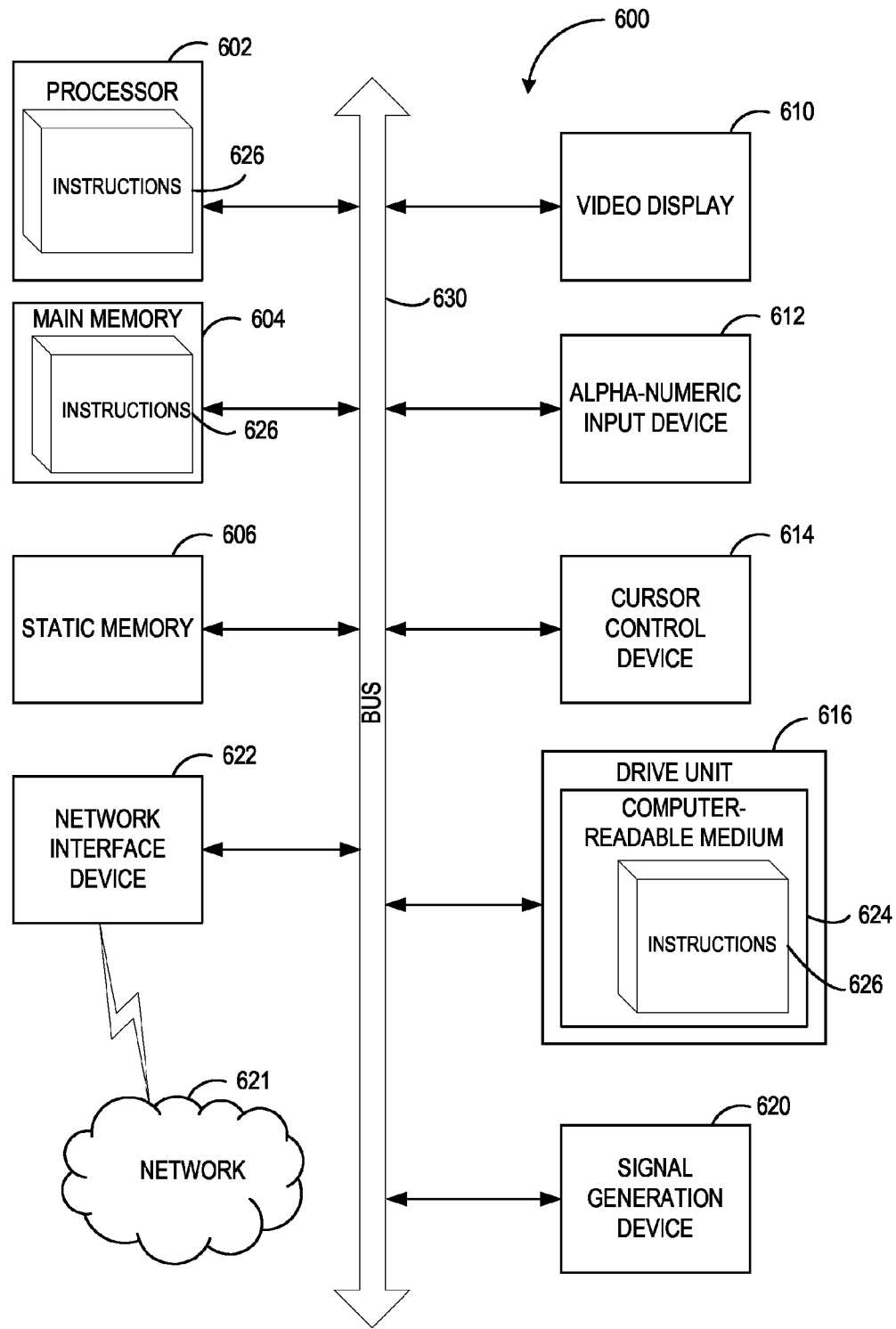
FIG. 6 illustrates a diagrammatic representation of a machine in the exemplary form of a computer system, in accordance with one embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a smart phone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622 to communicate with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 664 via the network interface device 622.

In one embodiment, the instructions 626 include instructions for the object analyzer 133 and/or the query manager 120 of FIG. 1. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "executing," "re-executing," "monitoring," "refraining," "determining," "subscribing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving requests, from a plurality of requestors, to execute a plurality of queries pertaining to a plurality of objects in a virtual machine system, wherein each of the plurality of queries is associated with one of the plurality of requestors;
executing the plurality of queries pertaining to the plurality of objects in the virtual machine system to provide a plurality of query results to the plurality of requestors;
receiving, by a processing device, change data indicative of a change in one or more of the plurality of objects;
identifying one or more queries impacted by the change data and determining a priority for the change;
determining a schedule time to re-execute the one or more queries based on the priority for the change;
re-executing the one or more queries according to the schedule time to generate updated query results;
refraining from re-executing queries not impacted by the change data;
identifying one or more requestors associated with the one or more queries; and
transmitting the updated query results.

2. The method of claim 1, wherein a query is impacted by the change data if the change data is associated with a result of the query or if the change is associated with one or more criteria of the query.

3. The method of claim 1, wherein re-executing the one or more queries comprises re-executing the one or more queries at a specified time.

4. The method of claim 3, wherein the specified time is in view of the change data.

5. The method of claim 1, wherein re-executing the one or more queries comprises re-executing the one or more queries immediately after receiving the change data.

6. The method of claim 1, wherein the change data is indicative of at least one of:
an addition of an object to the virtual machine system;
a removal of an object from the virtual machine system;
a change in configuration of an object in the virtual machine system; or
a change in utilization of an object in the virtual machine system.

7. The method of claim 1, further comprising:
subscribing previously executed queries to an event generated in view of the change data, wherein re-executing the one or more queries impacted by the change data comprises determining a set of queries subscribed to the event and re-executing each query in the set of queries.

8. A system comprising:
a memory; and
a processing device, operatively coupled to the memory, to:
receive requests, from a plurality of requestors, to execute a plurality of queries pertaining to a plurality of objects in a virtual machine system, wherein each of the plurality of queries is associated with one of the plurality of requestors;
execute the plurality of queries pertaining to the plurality of objects in the virtual machine system to provide a plurality of query results to the plurality of requestors;
receive change data indicating a change in one or more of the plurality of objects;
identify one or more queries impacted by the change data and determining a priority for the change;
determining a schedule time to re-execute the one or more queries based on the priority for the change;
re-execute the one or more queries according to the schedule time to generate updated query results;
refrain from re-executing queries not impacted by the change data;
identify one or more requestors associated with the one or more queries; and
transmit the updated query results.

9. The system of claim 8, wherein a query is impacted by the change data if the change data is associated with a result of the query or if the change is associated with one or more criteria of the query.

10. The system of claim 8, wherein re-executing the one or more queries comprises re-executing the one or more queries at a specified time.

11. The system of claim 10, wherein the specified time is in view of the change data.

12. The system of claim 8, wherein re-executing the one or more queries comprises re-executing the one or more queries immediately after receiving the change data.

13. The system of claim 8, wherein the change data is indicative of at least one of:
an addition of an object to the virtual machine system;
a removal of an object from the virtual machine system;
a change in configuration of an object in the virtual machine system; or
a change in utilization of an object in the virtual machine system.

14. The system of claim 8, wherein the processing device is further to:
subscribe previously executed queries to an event generated in view of the change data, wherein re-executing the one or more queries impacted by the change data comprises determining a set of queries subscribed to the event and re-executing each query in the set of queries.

15. A non-transitory machine-accessible storage medium to store instructions that when executed, cause a processing device to:
receive, from a plurality of requestors, requests to execute a plurality of queries pertaining to a plurality of objects in a virtual machine system, wherein each of the plurality of queries is associated with one of the plurality of requestors;
execute the plurality of queries pertaining to the plurality of objects in the virtual machine system to provide a plurality of query results to the plurality of requestors;
receive change data indicating a change in one or more of the plurality of objects;
identify one or more queries impacted by the change data and determining a priority for the change;
determining a schedule time to re-execute the one or more queries based on the priority for the change;
re-executing the one or more queries according to the schedule time to generate updated query results;
refrain from re-executing queries not impacted by the change data;
identify one or more requestors associated with the one or more queries; and
transmit the updated query results.

16. The non-transitory machine-accessible storage medium of claim 15, wherein a query is impacted by the change data if the change data is associated with a result of the query or if the change is associated with one or more criteria of the query.

17. The non-transitory machine-accessible storage medium of claim 15, wherein to re-execute the one or more queries, the processing device is to re-execute the one or more queries at a specified time.

18. The non-transitory machine-accessible storage medium of claim 15, wherein re-execute the one or more queries, the processing device is to re-execute the one or more queries immediately after receiving the change data.

19. The non-transitory machine-accessible storage medium of claim 15, wherein the change data is indicative of at least one of:
an addition of an object to the virtual machine system;
a removal of an object from the virtual machine system;
a change in configuration of an object in the virtual machine system; or
a change in utilization of an object in the virtual machine system.

20. The non-transitory machine-accessible storage medium of claim 15, the processing device is further to:
subscribe previously executed queries to an event generated in view of the change data, wherein to re-execute the one or more queries impacted by the change data, the processing device is to determine a set of queries subscribed to the event and re-executing each query in the set of queries.

* * * * *